(12) United States Patent
Hoshina et al.

(10) Patent No.: US 10,508,726 B2
(45) Date of Patent: Dec. 17, 2019

(54) FASTENING STRUCTURE FOR FLEXIBLE EXTERNALLY TOOTHED GEAR OF STRAIN WAVE GEARING AND SHAFT MEMBER

(71) Applicant: Harmonic Drive Systems Inc., Shinagawa-ku, Tokyo (JP)

(72) Inventors: Tatsuro Hoshina, Azumino (JP); Masaru Kobayashi, Azumino (JP); Akira Nagai, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 447 days.

(21) Appl. No.: 15/532,857

(22) PCT Filed: Dec. 5, 2014

(86) PCT No.: PCT/JP2014/082334
§ 371 (c)(1),
(2) Date: Jun. 2, 2017

(87) PCT Pub. No.: WO2016/088277
PCT Pub. Date: Jun. 9, 2016

(65) Prior Publication Data
US 2017/0335941 A1    Nov. 23, 2017

(51) Int. Cl.
*F16H 49/00* (2006.01)
*F16H 57/00* (2012.01)

(52) U.S. Cl.
CPC ....... *F16H 49/001* (2013.01); *F16H 57/0025* (2013.01); *F16H 2049/003* (2013.01)

(58) Field of Classification Search
CPC ........................... F16H 49/001; F16H 57/0025
(Continued)

(56) References Cited

U.S. PATENT DOCUMENTS 9,441,721 B2 * 9/2016 Orii ...................... F16H 57/0404
9,709,151 B2 * 7/2017 Kurogi .................. F16H 49/001
2002/0174742 A1* 11/2002 Kobayashi .............. F16C 33/60
74/640

FOREIGN PATENT DOCUMENTS

JP          61-40513 U      3/1986
JP          61-204043 U    12/1986
(Continued)

OTHER PUBLICATIONS

International Search Report (PCT/ISA/210) dated Mar. 3, 2015, by the Japanese Patent Office as the International Searching Authority for International Application No. PCT/JP2014/082334.
(Continued)

*Primary Examiner* — Ha Dinh Ho
(74) *Attorney, Agent, or Firm* — Buchanan Ingersoll & Rooney PC

(57) ABSTRACT

A boss-side fastening surface formed in a boss of a flexible externally toothed gear of a strain wave gearing and a shaft-side fastening surface of an output shaft are coaxially fastened with bolts. The boss-side fastening surface is a convex-side fastening surface defined by two symmetrical inclined surfaces that are intersected at a prescribed angle to form a ridge line on a diameter line of the surface. The shaft-side fastening surface is a concave-side fastening surface defined by two symmetrical inclined surfaces that are intersected at a prescribed angle to form a trough line on a diameter line of the surface. The inclination angle of the inclined surfaces is set in the range of 2° to 16°. Transmission torques equal to or larger than those for combined bolt and pin fastening can be secured with bolt-only fastening.

5 Claims, 12 Drawing Sheets

(58) Field of Classification Search
USPC .......................................................... 74/640
See application file for complete search history.

(56) References Cited

FOREIGN PATENT DOCUMENTS

| | | |
|---|---:|---|
| JP | 1-91150 U | 6/1989 |
| JP | H-5-248502 A | 9/1993 |
| JP | 2002-339990 A | 11/2002 |
| JP | 2009-275528 A | 11/2009 |
| WO | WO 2014/181373 A1 | 11/2014 |

OTHER PUBLICATIONS

Written Opinion (PCT/ISA/237) dated Mar. 3, 2015, by the Japanese Patent Office as the International Searching Authority for International Application No. PCT/JP2014/082334.

* cited by examiner

FIG. 4

| | A | | | B | | |
|---|---|---|---|---|---|---|
| | TRANSMISSION TORQUE (Nm) | SURFACE INCLINATION ANGLE (deg) | AXIS-DIRECTION DIMENSION (mm) | TRANSMISSION TORQUE (Nm) | SURFACE INCLINATION ANGLE (deg) | AXIS-DIRECTION DIMENSION (mm) |
| BOLT FASTENING | 64 | 0 | 0 | 77 | 0 | 0 |
| BOLT+PIN FASTENING | 108 | 0 | 0 | 166 | 0 | 0 |
| 2 CONCAVE/CONVEX SURFACE | 108 | 5.9 | 0.89 | 166 | 9.6 | 1.46 |

(a)

(BEFORE FASTENING)

(b)

(AFTER FASTENING)

FASTENING STRUCTURE FOR FLEXIBLE EXTERNALLY TOOTHED GEAR OF STRAIN WAVE GEARING AND SHAFT MEMBER

TECHNICAL FIELD

The present invention relates to a fastening structure for fastening the flexible externally toothed gear of a strain wave gearing to a shaft member in a coaxial manner.

BACKGROUND ART

There have been known strain wave gearings provided with a cup-shaped or silk-hat-shaped flexible externally toothed gear. In a strain wave gearing, the flexible externally toothed gear thereof is set to be a reduced-speed-rotation output element, from which a reduced-speed rotation is transmitted to an output shaft, for example. While, in a strain wave gearing disclosed in Patent document 1, a rotation transmitted from an input shaft to the flexible externally toothed gear is reduced in speed and is outputted from the rigid internally toothed gear side.

Fastening between a flexible externally toothed gear and an output shaft, an input shaft or other shaft members is carried out in such a manner that a rigid boss formed in the flexible externally toothed gear is fixedly fastened in a coaxial manner to a shaft member with bolts being fastened. For example, the boss of a flexible externally toothed gear is sandwiched between a pressing plate and an input shaft, and in this state, is fixedly fastened in a coaxial manner to the input shaft by using bolts.

PRIOR ART DOCUMENT

Patent Document

Patent Document 1: JP 05-248502 A

SUMMARY OF THE INVENTION

Problems to be Solved by the Invention

In a case in which there is required to transmit a large torque between a flexible externally toothed gear and a shaft member to be fixedly fastened thereto, a fastening structure in which bolts and pins are used together is employed. Where such a fastening structure as combined with pins is employed, pin holes must be formed with high machining accuracy, which leads to extremely high processing cost.

An object of the present invention is to provide a fastening structure enabling to assure the torque transmission capacity of bolt fastening that is equal to or more than in a case of bolt-pin combined fastening, without accompanied by increase in connecting dimension between the boss of flexible externally toothed gear and a shaft member.

Further, an object of the present invention is to provide a strain wave gearing in which the boss of a flexible externally toothed gear is fixedly fastened to a shaft member with using the navel fastening structure.

Means of Solving the Problems

In order to solve the above problems, a fastening structure for a flexible externally toothed gear of a strain wave gearing and a shaft member according to the present invention is characterized to includes:

an annular or circular boss-side fastening surface formed in an end surface of a rigid boss in the flexible externally toothed gear;

a shaft-side fastening surface formed on an end surface of the shaft member to be fixedly fastened to the boss in a coaxial manner; and a fastener for fixedly fastening the boss and the shaft member along a direction of a center axis line in a state in which the boss-side fastening surface is in contact with the shaft-side fastening surface in a coaxial manner, wherein one fastening surface selected from the boss-side fastening surface and the shaft-side fastening surface is a convex-side fastening surface defined by first and second inclined surfaces, the first and second inclined surfaces being intersected at a prescribed angle to form a ridge line on a diameter line of the one fastening surface, and the first and second inclined surfaces being symmetrical with each other with respect to a plane including the ridge line and the center axis line;

the other fastening surface selected from the boss-side fastening surface and the shaft-side fastening surface is a concave-side fastening surface defined by third and fourth inclined surfaces, the third and fourth inclined surfaces being intersected at a prescribed angle to form trough line on a diameter line of the other fastening surface, and the third and fourth inclined surfaces being symmetrical with each other with respect to a plane including the trough line and the center axis line; and an inclination angle of each of the first to fourth inclined surfaces with respect to an axis-orthogonal plane has a value in a range between 2° and 16°, where the axis-orthogonal plane is a plane orthogonal to the center axis line.

In the fastening structure of the present invention, the one fastening surface selected from the boss-side fastening surface and the shaft-side fastening surface is set to be the convex-side fastening surface defined by two symmetrical first and second inclined surfaces, and the other fastening surface is set to be the concave-side fastening surface defined by two symmetrical third and fourth inclined surfaces. The first to fourth inclined surfaces defining the fastening surface are set to have a small inclination angle between 2° and 16°. According to experiments conducted by the inventors of the present invention et al., it was confirmed that the fastening structure of the present invention is capable of transmitting a torque equal to or larger than in a case in which the combination of bolts and pins are used to fixedly fasten together flat surfaces orthogonal to the axis line as in the prior art.

In addition, manufacturing of each fastening surface in the fastening structure of the present invention is easier than that of pin holes. It is therefore possible to realize, with simple manufacturing, a fastening structure that is capable of transmitting a torque equal to or larger than in a case in which axis-orthogonal surfaces are fastened together by using the combination of bolts and pins. Furthermore, there is no need to increase in axis-directional dimension in order for transmission toques to increase.

Further, in the fastening structure of the present invention, an axial force that is required to transmit a prescribed torque between the flexible externally toothed gear and the shaft member can be small. The number of fastening bolts can be reduced, and alternatively the size of bolts to be used can be reduced. Thus, a space for the fastening portion of the both members can be saved. Further, when the boss is formed with a hollow part extending to pass through the center thereof, it is possible to increase the diameter of the hollow part without increasing the outer diameter of the boss.

In the present invention, as mentioned above, the first to fourth inclined surfaces defining the respective fastening surfaces have an inclination angle, the value of which is set to be within a range between 2° and 16°.

According to experiments conducted by the present inventors et al., it was confirmed that the transmission torque cannot be sufficiently increased when the inclination angle is less than 2°. Specifically, it was confirmed that it is difficult to secure transmission torque equal to or larger than in the prior art (in a case in which the both fastening surfaces are flat surfaces parallel to an axis-orthogonal plane and are fastened together by using a combination of bolts and pins).

Conversely, when an inclination angle exceeding 16° is adopted, the axis-directional dimension (thickness dimension) of the boss of the flexible externally toothed gear is greatly increased in order to form fastening surfaces having such a large inclination angle, which is not practical. By maintaining the inclination angle equal to or less than 16°, the axis-directional dimension that is required to form two inclined surfaces for fastening can be made sufficiently smaller than a normal thickness dimension of the boss in the flexible externally toothed gear.

In the fastening structure of the present invention, it is desirable that the first and second inclined surfaces defining the convex-side fastening surface have the inclination angle that is smaller by an amount ranging from 0.5° to 1.5° than the inclination angle of the third and fourth inclined surfaces defining the concave-side fastening surface.

It is possible to increase a contact ratio between the both fastening surfaces by setting the inclination angle of the convex-side fastening surface to be slightly smaller than the inclination angle of the concave-side fastening surface. Specifically, when the both fastening surfaces are fastened by bolts or other fasteners in the axis line direction, the outer peripheral edge portions, in the direction of inclination, of the first and second inclined surfaces in the convex-side fastening surface come in first contact with the outer peripheral edge portions, in the direction of inclination, of the third and fourth inclined surfaces in the concave-side fastening surface. According to increase in the axial force exerted by the bolts or other fasteners, the both fastening surfaces are elastically deformed, and the contact regions therebetween spreads toward the center side from the outer peripheral side. Therefore, the both fastening surfaces are fixedly fastened steadily in the axis line direction, whereby a fastening structure having a large transmission torque capacity can be formed reliably.

Next, a strain wave gearing of the present invention is characterized by comprising: a rigid internally toothed gear, a flexible externally toothed gear, and a wave generator for flexing the flexible externally toothed gear in a radial direction to mesh with the rigid internally toothed gear and for moving meshing positions between the both gears in a circumferential direction, wherein the flexible externally toothed gear has a boss to be fixedly fastened to a shaft member in coaxial manner, and the boss is formed with the boss-side fastening surface for use in the above-mentioned fastening structure.

In addition, a strain wave gearing of the present invention is characterized by comprising: a rigid internally toothed gear, a flexible externally toothed gear, a wave generator for flexing the flexible externally toothed gear in a radial direction to mesh with the rigid internally toothed gear and for moving meshing positions between the both gears in a circumferential direction, and a shaft member that is fastened to coaxially fix to a boss formed in the flexible externally toothed gear by a fastener, wherein the boss and the shaft member are fastened to fix with each other by the above-mentioned fastening structure.

BRIEF DESCRIPTION OF THE DRAWINGS

FIG. 4 is a diagram showing experimental results in which transmission torques of respective fastening structures are compared with one another;

MODE FOR CARRYING OUT THE INVENTION

An embodiment of a strain wave gearing provided with a fastening structure to which the present invention is applied will be described with reference to the drawings.

Embodiment 1

Figure 1:
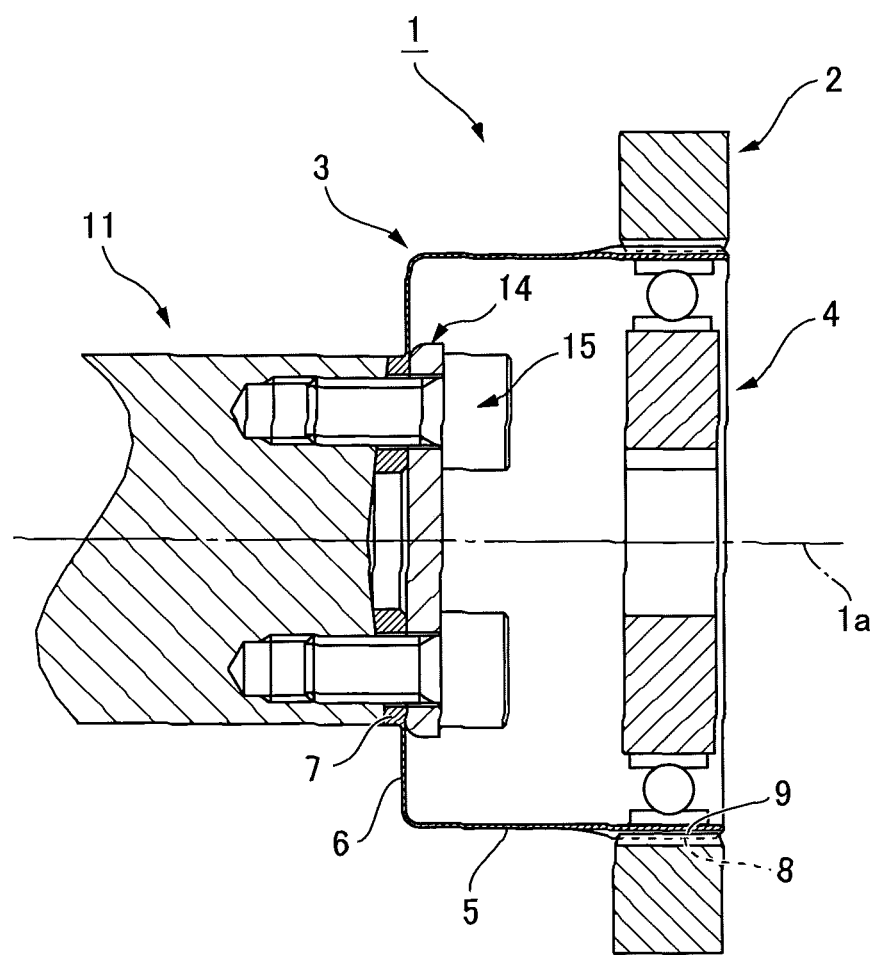
FIG. 1 is a schematic sectional view showing a strain wave gearing to which the present invention is applied.

FIG. 1 is a schematic sectional view showing a strain wave gearing according to Embodiment 1. The strain wave gearing 1 has an annular rigid internally toothed gear 2, a cup-shaped flexible externally toothed gear 3 disposed coaxially inside the rigid internally toothed gear, and an elliptically contoured wave generator 4 disposed inside the flexible externally toothed gear. The cup-shaped flexible externally toothed gear 3 has a cylindrical body part 5 which is flexible in a radial direction, a discoid diaphragm 6 extending inward in a radial direction from one end of the cylindrical body part 5, and an annular rigid boss 7 formed integrally in the inner peripheral edge of the diaphragm 6.

External teeth 8 are formed on an outer circumferential surface portion of the other opening-end side of the cylindrical body part 5, and the external teeth 8 are capable of meshing with internal teeth 9 of the rigid internally toothed gear 2.

The portion of the external teeth 8 of the flexible externally toothed gear 3 is made to flex into an elliptical shape by the wave generator 4 fitted thereinto, whereby external teeth 8 located at both ends in the direction of the major axis of the elliptical shape are meshed with the internal teeth 9 of the rigid internally toothed gear 2. The wave generator 4 is driven to rotate by a not-shown drive source such as a motor. When the wave generator 4 is rotated, the meshing positions between the both gears 2 and 3 move in a circumferential direction. The difference in the number of teeth between the both gears is set to be 2n (n is a positive integer).

When the wave generator 1 rotates once, there is generated a relative rotation between the both gears 2 and 3 by an angle corresponding to the difference in the number of teeth therebetween. For example, if the rigid internally toothed gear 2 is fixed so as not to rotate, the flexible externally toothed gear 3 becomes a reduced-speed rotation output element and outputs a reduced-speed rotation. An output shaft 11 is coaxially fastened to fix to the boss 7 of the flexible externally toothed gear 3 by a pressing member 14 and bolts 15, and the reduced-speed rotation is transmitted to a not-shown driven member from the output shaft 11.

Figure 2A:
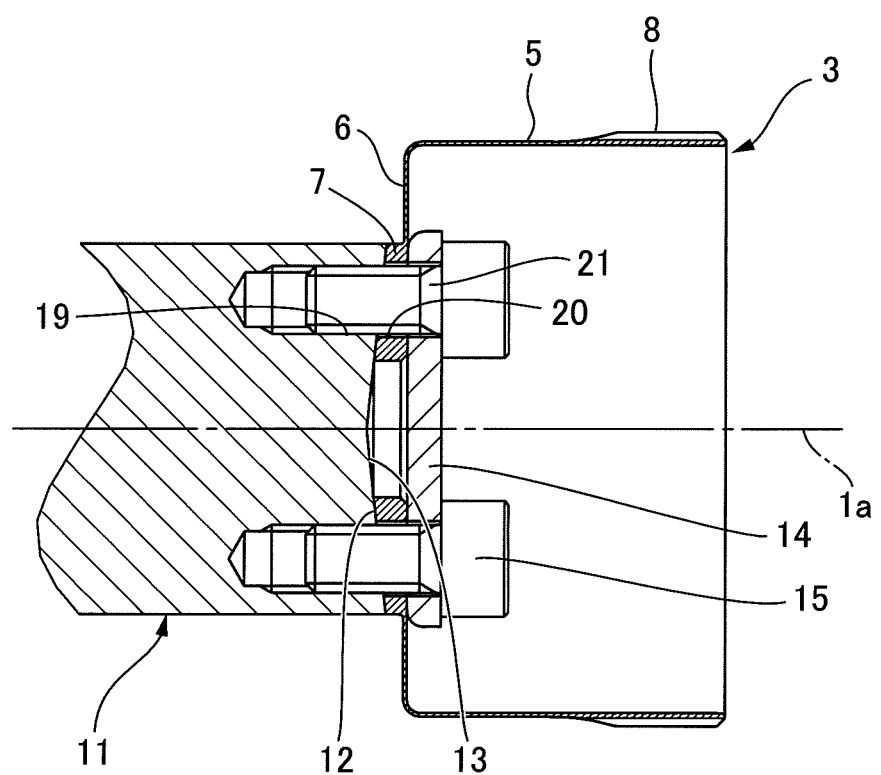
FIG. 2A is a partial sectional view showing a fastening structure between a boss of the flexible externally toothed gear of FIG. 1 and an output shaft.
Figure 2B:
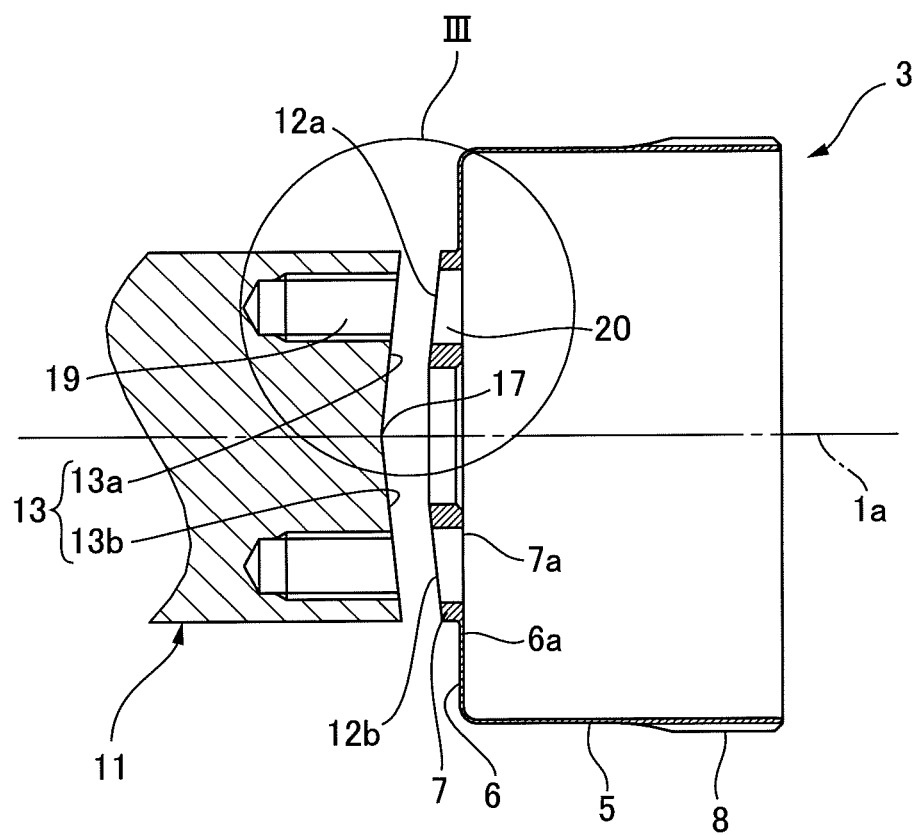
FIG. 2B is an explanatory view showing a state in which the flexible externally toothed gear and the output shaft of FIG. 2A are separated.
Figure 2C:
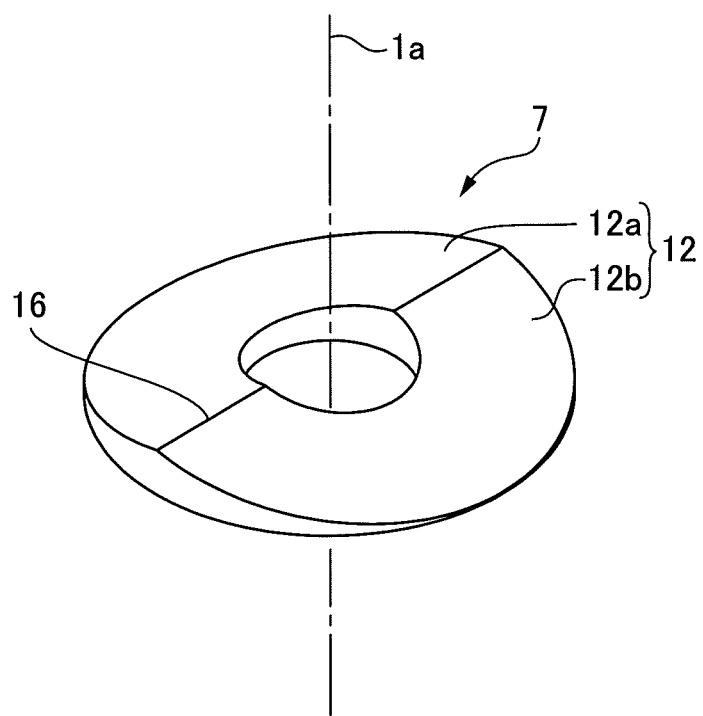
FIG. 2C is an explanatory view showing the shape of a boss-side fastening surface in the flexible externally toothed gear of FIG. 2A.
Figure 3:
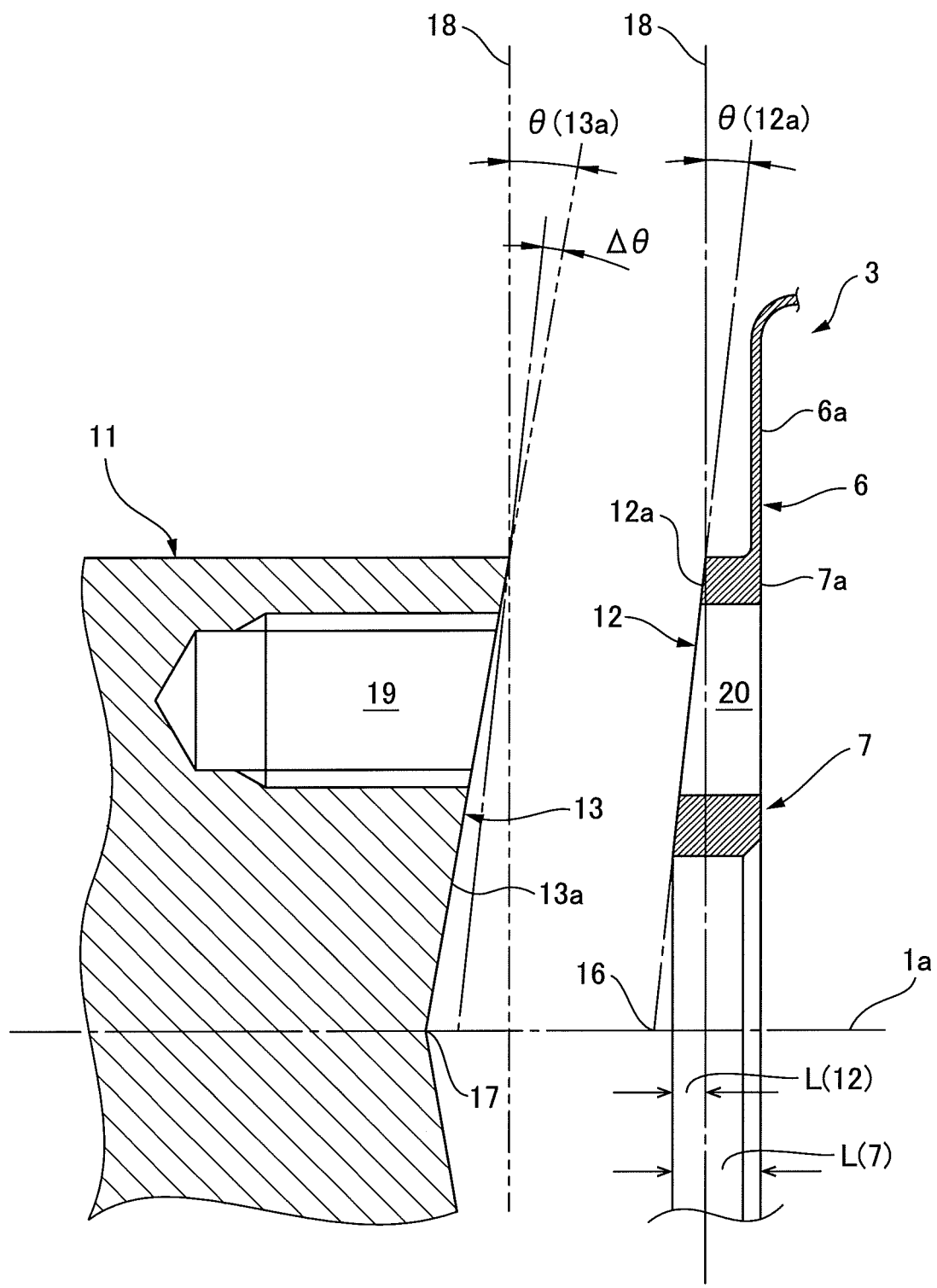
FIG. 3 is an enlarged partial sectional view showing a portion encircled by a circle line III in FIG. 2B.

FIG. 2A is a partial sectional view showing a fastening structure between the boss 7 of the flexible externally toothed gear 3 and the output shaft 11; FIG. 2B is an explanatory view showing a state in which the flexible externally toothed gear 3 and the output shaft 11 are separated; and FIG. 2C is an explanatory view showing the shape of a boss-side fastening surface formed in the boss 7. FIG. 3 is an enlarged partial sectional view showing a portion encircled by a circle line III in FIG. 2B.

Referring to these drawings, the fastening structure between the boss 7 and the output shaft 11 of the present example is constituted by a boss-side fastening surface 12 formed on an outer-side annular end surface of the boss 7, a shaft-side fastening surface 13 formed on a shaft-end surface of the output shaft 11, the discoid pressing member 14, and a plurality of fastening bolts 15.

The boss 7 is sandwiched between the pressing member 14 and the output shaft 11, and is fastened to fix to the side of the output shaft 11 by a plurality of bolts 15 that are mounted from the side of the pressing member 14. Whereby, the boss-side fastening surface 12 and the shaft-side fastening surface 13 are fastened with each other in a state in which the boss-side fastening surface 12 is in coaxial contact with the shaft-side fastening surface 13.

As shown in FIGS. 2B and 2C, the boss-side fastening surface 12 is a convex-side fastening surface defined by a first inclined surface 12a and a second inclined surface 12b, in which the first inclined surface and the second inclined surface are intersected at a prescribed angle to form a ridge line on a diametrical line 16 of the boss-side fastening surface 16. The first and second inclined surfaces 12a and 12b are inclined surfaces symmetrical with each other with respect to a plane including the diameter line 16 (the ridge line) and the center axis line 1a.

In contrast, as shown in FIG. 2B, the shaft-side fastening surface 13 is a concave-side fastening surface having an approximately complementary shape, and more specifically is a concave-side fastening surface defined by a third inclined surface 13a and a fourth inclined surface 13b, in which the third and fourth inclined surfaces are intersected at a prescribed angle to form a trough line on a diameter line 17 of the shaft-side fastening surface 13. The third and fourth inclined surfaces 13a and 13b are semi-circle inclined surfaces symmetrical with each other with respect to a plane including the diameter line 17 (the trough line) and the center axis line 1a.

Here, as shown in FIG. 3, the boss 7 has an outer-side end surface in the direction of the center axis line 1a as the boss-side fastening surface 12, and has an inner-side end surface 7a on the opposite side, the inner-side end surface being a flat surface continuously extending from the end surface 6a of the diaphragm 6. The end surface 7a is a surface extending in the direction orthogonal to the center axis line 1a. As described hereinafter, the respective inclined surfaces 12a, 12b, 13a and 13b are set to have a small inclination angle, so that the axis-direction dimension L(12) of the boss-side fastening surface 12 in the direction of the center axis line 1a is sufficiently small in comparison with the maximum thickness dimension L(7) of the boss 7 in the direction of the center axis line 1a.

The first inclined surface 12a of the boss-side fastening surface 12 has an inclination angle that is set to have a value within the range between 2° and 16° with respect to an axis-orthogonal surface 18. Therefore, the second inclined surface 12b symmetrical to the first inclined surface 12a is inclined at the same inclination angle toward the opposite direction.

The third inclined surface 13a of the shaft-side fastening surface 13 is inclined in the same direction as that of the first inclined surface 12a, and the inclination angle θ(13a) of the third inclines surface is also set to be a value within the range between 2° and 16°. The fourth inclined surface 13b symmetrical to the third inclined surface 13a is inclined in the opposite direction at the same inclination angle as that of the third inclined surface.

In the present example, as shown in FIG. 3, the inclination angles of the first and second inclined surfaces 12a and 12b defining the boss-side fastening surface 12 as the convex-side fastening surface, are smaller by an angle Δθ than the inclination angles of the third and fourth inclined surfaces 13a and 13b defining the shaft-side fastening surface 13 as the concave-side fastening surface, the angle Δθ being within 1°±0.5°.

Next, as shown in FIG. 2B, the output shaft 11 is formed with bolt holes 19 opening in the shaft-side fastening surface 13 at a constant pitch in the circumferential direction. As shown in FIGS. 2A and 2B, the boss 7 and the pressing member 14 are respectively formed with bolt-insertion holes at the same pitch as the bolt holes 19 in the circumferential direction. The boss 7 and the output shaft 11 are fastened to fix together by superposing these three members 11, 7 and 14 in this order, and by fastening the bolts from the side of the pressing member 14.

In the fastening structure of this configuration, when the inclination angles of the first and second inclined surfaces of the boss-side fastening surface 12 and the third and fourth inclined surfaces 13a and 13b of the shaft-side fastening surface 13 are increased, the transmission toque is also increased accordingly. According to the experiments conducted by the present inventors et al., it was confirmed that it is possible to transmit a torque equal to or larger than that of a conventional fastening structure when the inclination angle is set to be 2° or larger. Specifically, it is possible to transmit a torque equal to or larger than the transmission torque that is obtained in a case in which the boss-side fastening surface 12 and the shaft-side fastening surface 13 are set to be a flat surface orthogonal to the center axis line 1a, and the boss 7 and the output shaft 11 are fastened to fix together by using the combination of bolts and pins.

On the other hand, when the inclination angle becomes large, the axis-direction dimension L(12) of the boss-side fastening surface 12 becomes large accordingly, and the thickness of the boss 7 must be increased. As a result, the connecting dimension of the fastening portion between the boss 7 and the output shaft 11 is also increased. When consideration is made to the thickness dimension of the boss 7 in a generally-used cup-shaped (or a silk-hat-shaped) flexible externally toothed gear, it is practical that the inclination angle $\theta(12a)$ and $\theta(13a)$ be equal to or less than 16°.

FIG. 4 is a diagram showing an example of experimental results in which transmission torques of the fastening structure of this example is compared with those of fastening structures of the other constitutions. Transmission torques were measured respectively from strain wave gearings A and B in cases in which these gearings are provided with different fastening structures. In the diagram, "Bolt fastening" means a case in which the boss-side fastening surface 12 and the shaft-side fastening surface 13 are both flat surfaces orthogonal to the center axis line 1a, and the both surfaces are fastened to fix together by using bolts only. "Bolt+Pin Fastening" means a case in which the boss-side fastening surface 12 and the shaft-side fastening surface 13 are both flat surfaces orthogonal to the center axis line 1a, and the both surfaces are fastened to fix together by using the combination of bolts and pins. "2 Convex Concave Surface" means a case of the fastening structure of this example in which the inclination angle $\theta(12a)$ is 5.9° and the inclination angle $\theta(13a)$ is 6.0°.

The experiments were carried out for each case in a manner that the other conditions are set to be same, and it was confirmed that the fastening structure of the present example is able to obtain a transmission torque similar to the case in which bolts and pins are combinedly used.

Embodiment 2

Figure 5A:
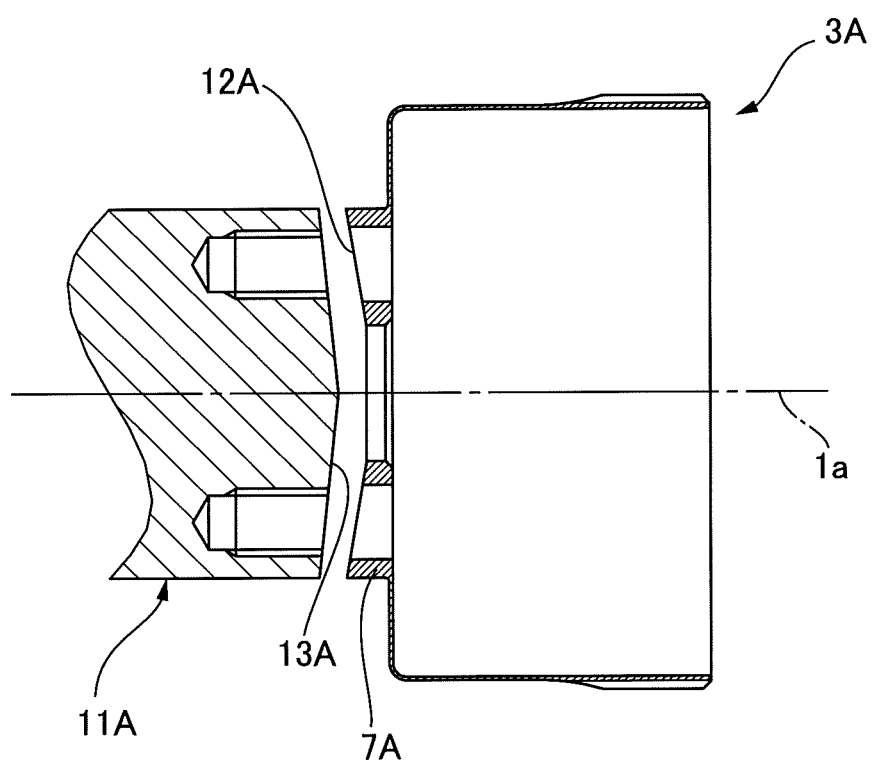
FIG. 5A is an explanatory view showing another example of fastening structure.
Figure 5B:
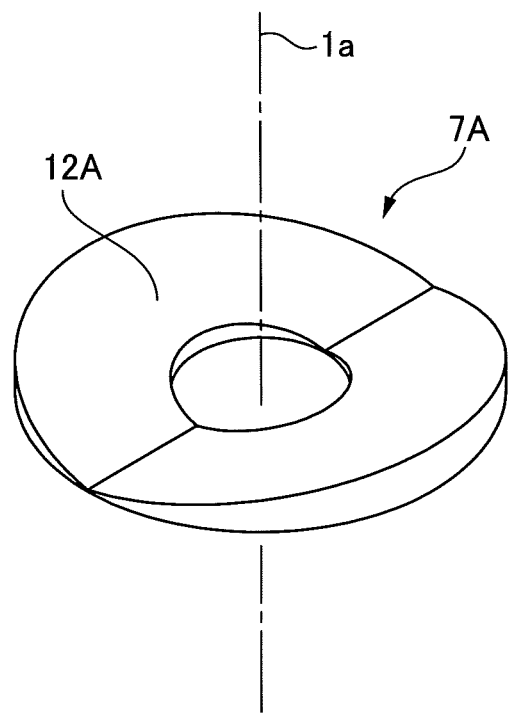
FIG. 5B is an explanatory view showing a shape of a boss-side fastening surface in FIG. 5A.

FIG. 5A is an explanatory view showing another example of the fastening structure according to the present invention, and FIG. 5B is an explanatory view showing the boss-side fastening surface of the fastening structure. In the example shown in these drawings, a flexible externally toothed gear 3A has an annular boss 7A formed with a boss-side fastening surface 12A as a concave-side fastening surface, and a shaft member 11A has a shaft-side fastening surface 13A as a convex-side fastening surface. The remaining configurations are the same as those of Embodiment 1.

Embodiment 3

Figure 6:
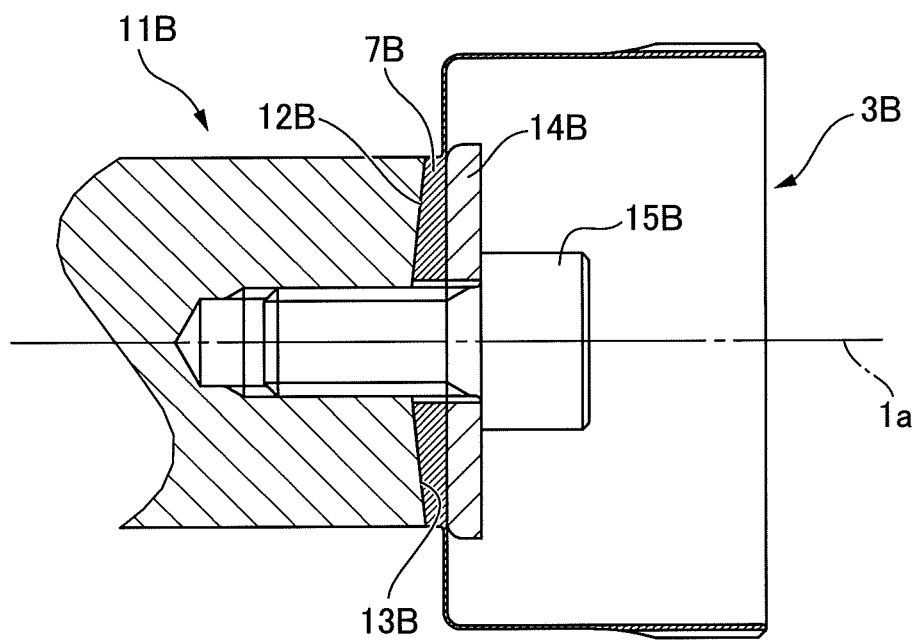
FIG. 6 is an explanatory view showing yet another example of fastening structure.

FIG. 6 is an explanatory view showing yet another example of the fastening structure according to the present invention. In the example shown in this drawing, a flexible externally toothed gear 3B has a boss 7B with a boss-side fastening surface 12B that is a convex-side fastening surface defined by two symmetrical inclined surfaces, and a shaft member 11B has a shaft-side fastening surface 13B that is a concave-side fastening surface defined by two symmetrical inclined surfaces. The boss-side fastening surface 12B and the shaft-side fastening surface 13B are fastened to fix together by a pressing member 14B and a bolt 15B. The bolt 15B is coaxially fastened to fix to the pressing member 14B, the boss 7B and the shaft member 11B.

In the above embodiments, the first to fourth inclined surfaces are respectively flat inclined surfaces. For example, the boss-side fastening surfaces are set to be the convex-side fastening surface defined by first and second inclined curved surfaces that are convex curved surfaces, and the shaft-side fastening surfaces are set to be the concave-side fastening surface defined by third and fourth curved surfaces that are concave curved surfaces. In this case, the inclination angle between an inclined plane and the axis-orthogonal plane can be set to be a value within the range of 2° to 16°, in which the inclined plane is a plane including the outer peripheral edge in the inclination direction in each fastening surface and the diameter line at which the fastening surfaces are intersected.

Embodiment 4

In the fastening structures in the above-mentioned embodiments 1 to 3, when the convex-side fastening surface defined by the two symmetrical first and second inclined surfaces and the concave-side fastening surface defined by the two symmetrical third and fourth inclined surfaces are made to come into contact with each other in a coaxial manner, it is desirable that alignment of these fastening surfaces be carried out easily.

When the first and second inclined surfaces of the convex-side fastening surface are in contact with the third and fourth inclined surfaces of the concave-side fastening surface, alignment of the both fastening surfaces is made in the inclination direction of these inclined surfaces. However, the both fastening surfaces cannot be aligned automatically in the direction orthogonal to the inclination direction, namely, the direction along the ridge line of the convex-side fastening surface (the direction of the trough line of the concave-side fastening surface).

In a fastening structure of Embodiment 4 as described hereinafter, the both fastening surfaces are formed with pin-insertion grooves extending in the direction orthogonal to the ridge line and the trough line of these fastening surfaces. The both fastening surfaces are superposed in the direction of the center axis line in a manner that pins are inserted into the pin-insertion grooves of the both fastening surfaces. Whereby, the both fastening surfaces are aligned in the direction orthogonal to the ridge line (the trough line) of the inclined surfaces defining these fastening surfaces by the pins.

Conventionally, fastening surfaces are provided with concave/convex fitting parts that can be fitted with each other in the direction of center axis line in order to align the rotational axes of two members to be fastened together. According to the fastening structure of Embodiment 4, the two fastening surfaces can be aligned without providing concave/convex fitting parts in outer peripheral portions of the fastening surfaces. In other words, the two fastening surfaces can be aligned by themselves.

Figure 7:
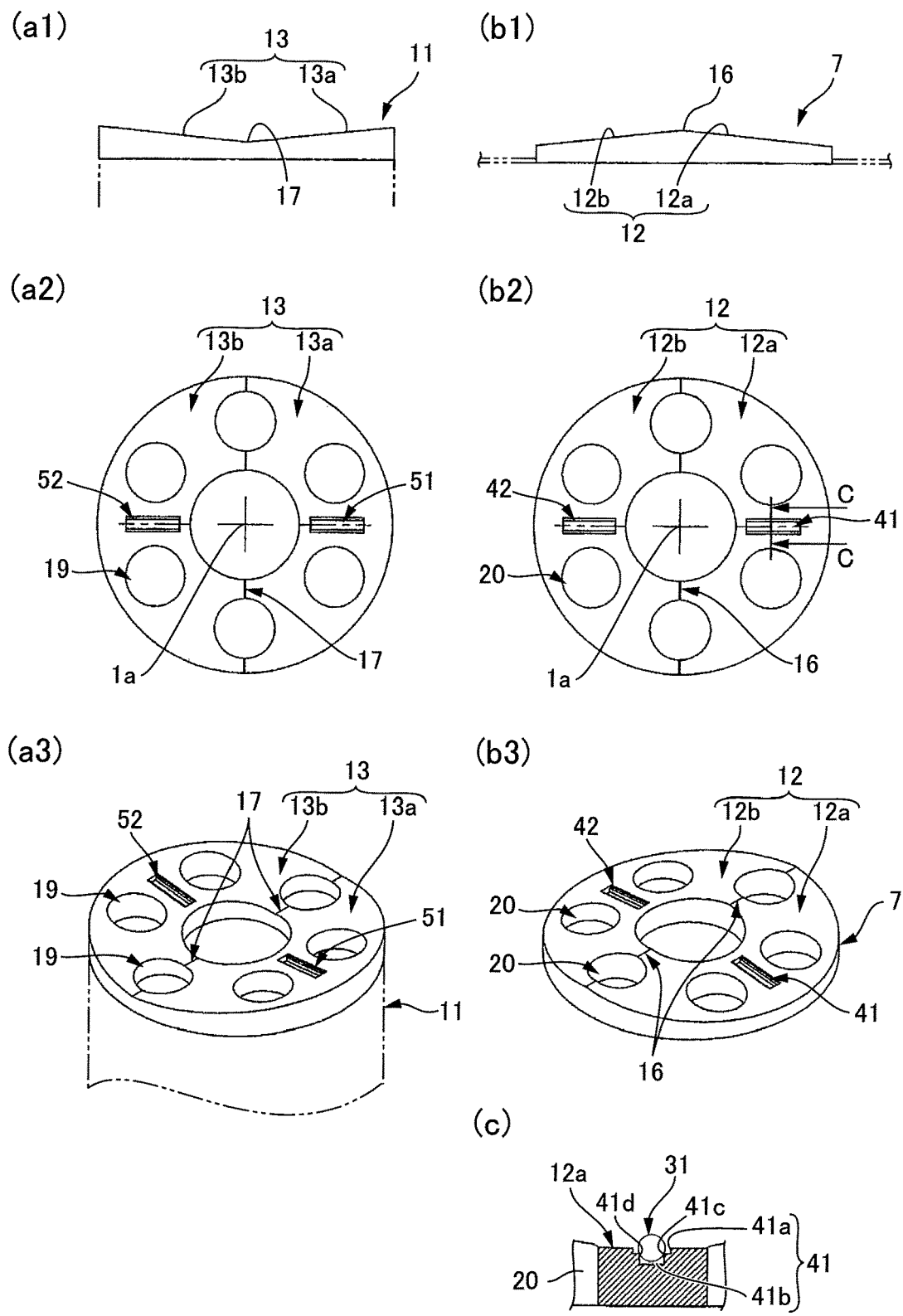
FIGS. 7($a$1) to 7($a$3) are respectively a side view, a plan view and a perspective view showing a portion of a concave-side fastening surface in a fastening structure to which the present invention is applied, FIGS. 7($b$1) to 7($b$3) are respectively a side view, a plan view and a perspective view showing a portion of a convex-side fastening surface thereof, and FIG. 7($c$) is a partial sectional view of a portion cut across a line of C-C in FIG. 7($b$2)
Figure 8:
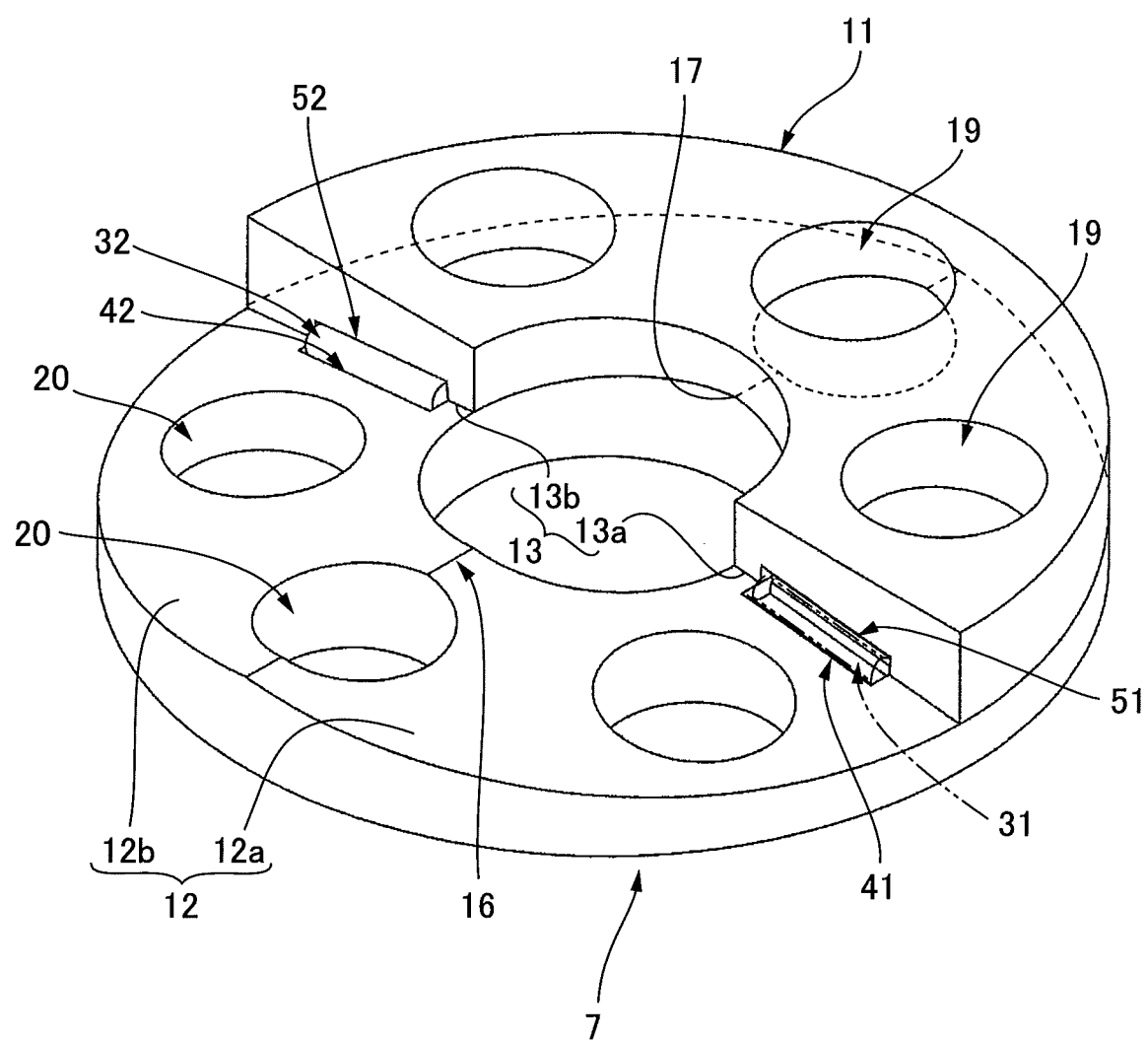
FIG. 8 is a perspective view showing a condition in which the portions of the convex-side fastening surface and the concave-side fastening surface in FIG. 7 are superposed, in a manner that a half of the portion of the concave-side fastening surface is removed.

FIG. 7 shows the fastening structure of Embodiment 4, in which FIGS. 7(a1) to (a3) are respectively a side view, a plan view and a perspective view showing a portion of a concave-side fastening surface; FIGS. 7(b1) to (b3) are respectively a side view, a plan view and a perspective view showing a portion of a convex-side fastening surface; and FIG. 7(c) is a partial sectional view showing a portion cut along a line of C-C in FIG. 7(b2). FIG. 8 is a perspective view showing a condition in which the portions of the convex-side fastening surface and the concave-side fastening surface in FIG. 7 are superposed, in a manner that a half of the portion of the concave-side fastening surface is removed.

The fastening structure shown in these drawings is a modified example of the fastening structure of Embodiment 1 shown in FIGS. 1 to 4, and the convex-side fastening surfaces and a concave-side fastening surface of the fastening structure of the modified example are shown. Portions corresponding to those in the fastening structure shown in FIGS. 1 to 4 are denoted by the same reference numerals, and explanation of these portions will be omitted.

The fastening structure of Embodiment 4 has: a convex-side fastening surface 12 that is an annular boss-side fastening surface formed on the end surface of the rigid boss 7 of the flexible externally toothed gear 3; a concave-side fastening surface that is a shaft-side fastening surface formed on the end surface of the output shaft 11 (shaft member) to be fastened to fix to the boss 7 coaxially; a plurality of bolts (not shown) for fastening to fix the convex-side fastening surface 12 and the concave-side fastening surface 13 in the direction of the center axis line 1a in a manner that the convex-fastening surface and the concave-side fastening surface are in coaxial contact with each other; and two elongated columnar first pin 31 and second pin 32 for alignment that are inserted between the convex-side fastening surface 12 and the concave-side fastening surface 13. In an actual fastening, the pressing member 14 is also used as in the case of the fastening structure shown in FIGS. 1 to 4, but is omitted in FIGS. 7 and 8.

The convex-side fastening surface 12 is defined by first and second inclined surfaces 12a and 12b that are intersected by a prescribed angle to form a ridge line 16 on a diameter line of the fastening surface 12 and are symmetrical with each other with respect to a flat plane including the ridge line 16 and the center axis line 1a. The concave-side fastening surface 13 is defined by third and fourth inclined surfaces 13a and 13b that are intersected by a prescribed angle to form a trough line 17 on a diameter line of the fastening surface 13 and are symmetrical with each other with respect to a plane including the trough line 17 and the center axis line 1a.

Here, the convex-side fastening surface 12 is formed with a first convex-surface-side pin-insertion groove 41 and a second convex-surface-side pin-insertion groove 42, the grooves extending along a diameter line orthogonal to the ridge line 16. Likewise, the concave-side fastening surface 13 is formed with a first concave-surface-side pin-insertion groove 51 and a second concave-surface-side pin-insertion groove 52, the grooves extending along the direction orthogonal to the trough line 17. As shown in FIG. 8, the convex-side fastening surface 12 and the concave-side fastening surface 14 are fastened to fix together in a manner in which the ridge line 16 and the trough line 17 are aligned, and the first and second pins 31 and 32 are respectively inserted between the first and second convex-surface-side pin-insertion grooves 41, 42 and the first and second concave-surface-side pin-insertion grooves 51, 52.

More specifically, the first and second convex-surface-side pin-insertion grooves 41 and 42 are grooves that have a constant width and a constant depth, and are formed symmetrically with respect to the center axis line 1a as a symmetrical center. Likewise, the first and second concave-surface-side pin-insertion grooves 51 and 52 are grooves that have a constant width and a constant depth, and are formed symmetrically with respect to the center axis line 1a as a symmetrical center. The first and second convex-surface-side pin-insertion grooves 41 and 42 are respectively formed in the positions corresponding to the first and second concave-surface-side pin-insertion grooves 51 and 52 in the diameter direction passing through the center axis line. In this example, since the first and second convex-surface-side pin-insertion grooves 41 and 42, and the first and second concave-surface-side pin-insertion grooves 51 and 52 are of the same shape and size, only the first convex-surface-side pin-insertion groove 41, the first concave-surface-side pin-insertion groove 51 and the first pin 31 will be described below.

Figure 9:
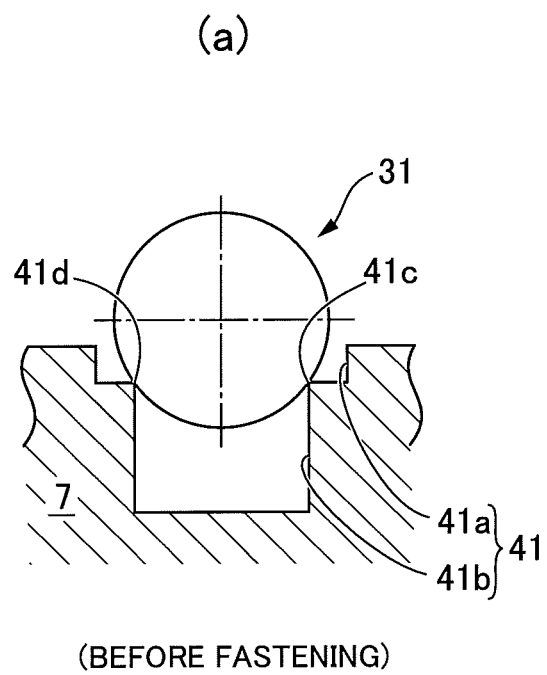
FIGS. 9(A) and 9(B) include explanatory views showing a before-fastening condition in which a pin is inserted into a convex-side insertion groove and an after-fastening condition in which the pin has been inserted between the convex-side insertion groove and a concave-side insertion groove.
Figure 9:
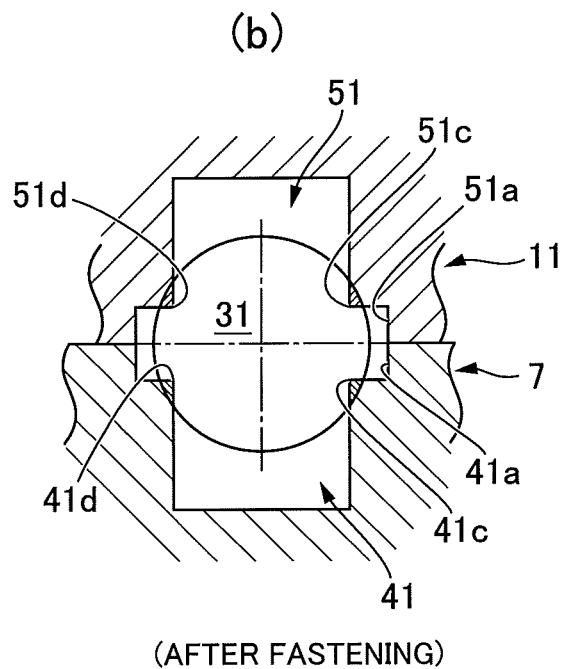

FIG. 9(a) is an explanatory view showing a before-fastening state in which the first pin 31 is inserted into the first convex-surface-side pin-insertion grooves 41, and FIG. 9(b) is an explanatory view showing an after-fastening state in which the first pin 31 is inserted between the first convex-surface-side pin-insertion groove 41 and the first concave-surface-side pin-insertion groove 51.

As shown in FIGS. 7(c) and 9(a), the first convex-surface-side pin-insertion groove 41 has a groove sectional shape constituted by a rectangular groove opening part 41a that is wider than the outer diameter of the first pin 31, and a rectangular groove bottom part 41b that is narrower than the outer diameter of the pin 31. For example, when the first pin 31 is inserted into the first convex-surface-side pin-insertion groove 41, the circular outer circumferential surface of the first pin 31 is supported in a line-contact manner by opening edges 41c and 41d on the both sides of the groove bottom part 41b, as shown in FIGS. 7(c) and 9(a).

As shown in FIGS. 8 and 9(b), the first pin 31, which is inserted between the boss-side first convex-surface-side pin-insertion groove 41 and the output-shaft-side first concave-surface-side pin-insertion groove 51, are sandwiched without any rattle from both sides along the direction of the center axis line 1a between the left and right opening edges 41c, 41d of the first convex-surface-side pin-insertion groove 41, and the left and right opening edges 51c, 51d of the first concave-surface-side pin-insertion groove 51.

Specifically, as shown in FIG. 9(a), more than half portion of the first pin 31 is projected from the insertion groove 41. When the boss 7 and the output shaft 11 are fastened with the first pin 31 being sandwiched, the opening edges 41c, 41d, 51c and 51d of the respective insertion grooves 41 and 51 are plastically deformed as shown by narrow-pitch diagonal lines in FIG. 9(b), whereby the position of the first pin 31 is fixed, and positioning by the first pin is performed. In addition, since sufficient relief parts (the wide groove opening parts 41a and 51a) are secured in the insertion grooves 41 and 51, the portions where the opening edges are plastically deformed do not interfere with the fastening surface of the other side.

In this fastening state, the both fastening surfaces 12 and 13 are positioned with each other in the direction orthogonal to the ridge line 16 and the trough line 17 by these lines. The fastening surfaces are also positioned in the direction of the ridge line 17 (the trough line 17) by the first and second pins 31 and 32 inserted along the direction of the diameter line orthogonal to the ridge line 16 (the trough line 17). Since the positioning in the orthogonal two directions is performed, the state of alignment, in which the center axis line of the fastening surface 12 and that of the fastening surface 13 are aligned, is established.

As described above, the fastening structure between the flexible externally toothed gear of the strain wave gearing and the shaft member includes: an annular or circular boss-side fastening surface formed on an end surface of a rigid boss of the flexible externally toothed gear; a shaft-side fastening surface formed on an end surface of the shaft member; a fastener for fastening to fix the boss and the shaft member in a direction of a center axis line in a manner in which the boss-side fastening surface and the shaft-side fastening surface are in coaxial contact with each other; and an aligning pin inserted between the boss-side fastening surface and the shaft-side fastening surface.

In addition, one fastening surface selected from the boss-side fastening surface and the shaft-side fastening surface is a convex-side fastening surface defined by a first and a second inclined surfaces that are intersected at a prescribed angle to form a ridge line on a diameter line of the one fastening surface, and are symmetrical with each other with respect to a plane including the ridge line and the center axis line. The other fastening surface selected from the boss-side fastening surface and the shaft-side fastening surface is a concave-side fastening surface defined by a third and fourth inclined surfaces that are intersected at a prescribed angle to form a trough line on the diameter line of the other fastening surface, and are symmetrical with each other with respect to a plane including the trough line and the center axis line.

The convex-side fastening surface is provided with a convex-surface-side pin-insertion groove extending in a direction orthogonal to the ridge line, and the concave-side fastening surface is provided with a concave-surface-side pin-insertion groove extending in a direction orthogonal to the trough line. The convex-side fastening surface and the concave-side fastening surface are fastened together in a manner in which the ridge line and the trough line are aligned, and the pin is inserted between the convex-surface-side pin-insertion groove and the concave-surface-side pin-insertion groove.

In the fastening structure of Embodiment 4, the pins include the first pin and the second pin. The convex-surface-side pin-insertion grooves include the first convex-surface-side pin-insertion groove and the second convex-surface-side pin-insertion groove that are formed symmetrically with respect to the center axis line. The concave-surface-side pin-insertion grooves include the first concave-surface-side pin-insertion groove and the second concave-surface-side pin-insertion groove that are formed symmetrically with respect to the center axis line. The first pin is inserted between the first convex-surface-side pin-insertion groove and the first concave-surface-side pin-insertion groove, and the second pin is inserted between the second convex-surface-side pin-insertion groove and the second concave-surface-side pin-insertion groove.

In addition, normally used columnar pins are used for the pins. The convex-surface-side pin-insertion groove and the concave-surface-side pin-insertion groove respectively have a groove sectional shape provided with a groove opening part wider than the outer diameter of the pin and a groove bottom part narrower than the outer diameter of the pin. The pin, which is inserted between the convex-surface-side pin-insertion groove and the concave-surface-side pin-insertion groove, is sandwiched between a pair of left and right opening edges of the one groove and a pair of left and right opening edges of the other groove, in a manner in which the pin is in line contact with a pair of left and right opening edges of the groove bottom part of each groove.

The invention claimed is:

1. A fastening structure for a flexible externally toothed gear of a strain wave gearing and a shaft member, the fastening structure comprising:
an annular or circular boss-side fastening surface formed on an end surface of a rigid boss in the flexible externally toothed gear;
a shaft-side fastening surface formed on an end surface of the shaft member to be fastened to fix to the boss coaxially; and
a fastener for fixedly fastening the boss and the shaft member along a direction of a center axis line in a state in which the boss-side fastening surface is in coaxial contact with the shaft-side fastening surface,
wherein one fastening surface which is either one of the boss-side fastening surface and the shaft-side fastening surface is a convex-side fastening surface defined by first and second inclined surfaces, the first and second inclined surfaces being intersected at a prescribed angle to form a ridge line on a diameter line of the one fastening surface, and the first and second inclined surfaces being symmetrical with each other with respect to a plane including the ridge line and the center axis line;
the other fastening surface of the boss-side fastening surface and the shaft-side fastening surface is a concave-side fastening surface defined by third and fourth inclined surfaces, the third and fourth inclined surfaces being intersected at a prescribed angle to form a trough line on a diameter line of the other fastening surface, and the third and fourth inclined surfaces being symmetrical with each other with respect to a flat plane including the trough line and the center axis line; and
an inclination angle of each of the first to fourth inclined surfaces with respect to an axis-orthogonal plane has a value in a range between 2° and 16°, where the axis-orthogonal plane is a plane orthogonal to the center axis line.

2. The fastening structure for the flexible externally toothed gear of the strain wave gearing and the shaft member according to claim 1, wherein an axis-direction dimension of the boss-side fastening surface in the direction of the center axis line is smaller than a thickness dimension of the boss in the direction of the center axis line.

3. The fastening structure for the flexible externally toothed gear of the strain wave gearing and the shaft member according to claim 1, wherein the first and second inclined surfaces defining the convex-side fastening surface have the inclination angle that is smaller by an amount ranging from 0.5° to 1.5° than the inclination angle of the third and fourth inclined surfaces defining the concave-side fastening surface.

4. A strain wave gearing comprising:
a rigid internally toothed gear;
a flexible externally toothed gear; and
a wave generator for flexing the flexible externally toothed gear in a radial direction to mesh with the rigid internally toothed gear and for moving meshing positions between the both gears in a circumferential direction,
wherein the flexible externally toothed gear has a boss to be fixedly fastened to a shaft member coaxially, and
the boss is formed with the boss-side fastening surface for use in the fastening structure according to claim 1.

5. A strain wave gearing comprising:
a rigid internally toothed gear;
a flexible externally toothed gear;
a wave generator for flexing the flexible externally toothed gear in a radial direction to mesh with the rigid internally toothed gear and for moving meshing positions between the both gears in a circumferential direction; and a shaft member that is fastened to fix coaxially to a boss formed in the flexible externally toothed gear by a fastener, wherein the boss and the shaft member are fixedly fastened coaxially with each other by the fastening structure according to claim 1.

* * * * *